(12) United States Patent
Nakashima et al.

(10) Patent No.: US 10,147,517 B1
(45) Date of Patent: Dec. 4, 2018

(54) WIRE HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Kazuo Nakashima, Yokkaichi (JP); Katsufumi Matsui, Yokkaichi (JP); Kouji Fukumoto, Yokkaichi (JP); Kentaro Tachi, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/778,675

(22) PCT Filed: Nov. 18, 2016

(86) PCT No.: PCT/JP2016/084316
§ 371 (c)(1),
(2) Date: May 24, 2018

(87) PCT Pub. No.: WO2017/098895
PCT Pub. Date: Jun. 15, 2017

(30) Foreign Application Priority Data

Dec. 7, 2015 (JP) .................. 2015-238797

(51) Int. Cl.
H01B 7/00 (2006.01)
H01R 4/70 (2006.01)
(Continued)

(52) U.S. Cl.
CPC ........... *H01B 7/24* (2013.01); *B60R 16/0207* (2013.01); *H01B 3/305* (2013.01); *H01B 3/423* (2013.01);
(Continued)

(58) Field of Classification Search
CPC ............. B60R 16/0207; C08L 23/0815; C08L 2205/02; H01B 3/28; H01B 3/305;
(Continued)

(56) References Cited

U.S. PATENT DOCUMENTS 6,242,097 B1 * 6/2001 Nishiguchi ............. B32B 27/08
428/383
2006/0226525 A1 * 10/2006 Osuga .................. H01L 23/3128
257/685
(Continued)

FOREIGN PATENT DOCUMENTS

JP 2002315130 A 10/2002
JP 2015173008 A 10/2015

OTHER PUBLICATIONS

Effects of Waste Ground Fluororubber Vulcanizate Powders on the Silicone RubberFluororubber_Apr. 2012.*
(Continued)

*Primary Examiner* — Timothy Thompson
*Assistant Examiner* — Guillermo Egoavil
(74) *Attorney, Agent, or Firm* — Reising Ethington, P.C.

(57) ABSTRACT

A wire harness that includes an electric wire provided with a conductor and an insulator that coats an outer periphery of the conductor, a terminal connected to the conductor at a terminal end of the electric wire, and a molded resin portion
(Continued)

that covers an outer periphery of the insulator at the terminal end of the electric wire and an outer periphery of an end portion on the electric wire side of the terminal. A storage modulus E' of the insulator that is measured using a dynamic viscoelasticity measurement device in a tensed mode at a temperature increase rate of 5° C./min and a frequency of 10. Hz is 100 MPa or less at 25° C. and 1 MPa or more at 250° C., and a starting temperature (T) of a rubbery plateau region (G) is 150° C. or less.

5 Claims, 4 Drawing Sheets

(51) Int. Cl.
    H02G 1/14      (2006.01)
    H01B 7/24      (2006.01)
    H01B 7/02      (2006.01)
    B60R 16/02     (2006.01)
    H01B 3/44      (2006.01)
    H01B 3/42      (2006.01)
    H01B 3/30      (2006.01)
    H01B 3/46      (2006.01)

(52) U.S. Cl.
    CPC ............ H01B 3/441 (2013.01); H01B 3/46 (2013.01); H01B 7/0045 (2013.01); H01B 7/02 (2013.01)

(58) Field of Classification Search
    CPC ............ H01B 3/441; H01B 3/46; H01B 7/00; H01B 7/24; H01B 7/0045; H01B 7/02; H01B 7/282; H01R 11/12; H01R 13/504; H01R 13/4367; H01R 13/5216; H01R 13/5845; H01R 4/70; H02G 1/14; H02G 1/145
    USPC .................... 174/70 R, 110, 78; 439/656
    See application file for complete search history.

(56) References Cited

U.S. PATENT DOCUMENTS

| | | | |
|---|---|---|---|
| 2010/0212931 A1* | 8/2010 | Park | C08L 23/0815 174/110 SR |
| 2013/0032377 A1 | 2/2013 | Morishita et al. | |
| 2016/0247598 A1* | 8/2016 | Nonaka | C08K 3/22 |
| 2017/0009115 A1* | 1/2017 | Kigami | C09J 7/38 |
| 2017/0149162 A1* | 5/2017 | Tomita | H01B 7/0045 |
| 2017/0324235 A1* | 11/2017 | Tachi | H01B 7/282 |
| 2018/0185706 A1* | 7/2018 | Tadaoka | A63B 37/005 |

OTHER PUBLICATIONS

Measurement of Dynamic Properties of Viscoelastic Materials_Oct. 2007.*
International Search Report and Written Opinion for Application No. PCT/JP2016/084316 dated Jan. 31, 2017; 4 pages.

* cited by examiner

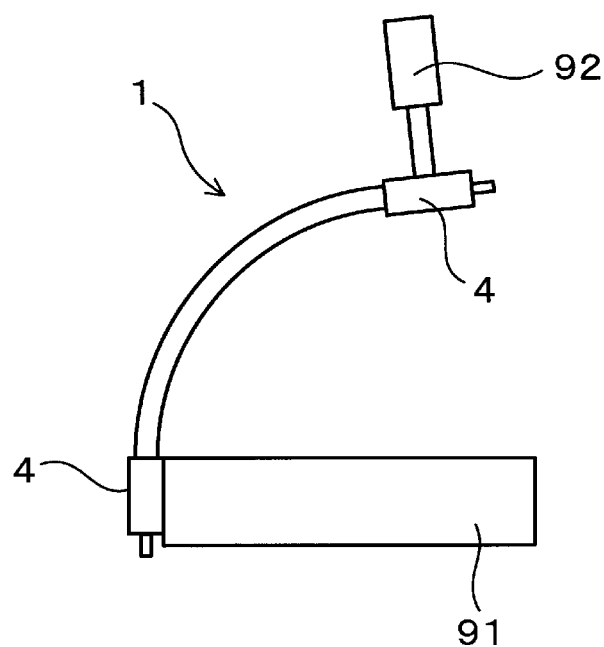

WIRE HARNESS

CROSS REFERENCE TO RELATED APPLICATIONS

This application claims the priority of Japanese patent application JP2015-238797 filed on Dec. 7, 2015, the entire contents of which are incorporated herein.

TECHNICAL FIELD

The present invention relates to a wire harness.

BACKGROUND ART

In recent years, wire harnesses for connecting an inverter and a motor have been used in automobiles such as hybrid cars and electric cars. As disclosed in Patent Document 1 (JP2015-133230A), for example, a wire harness including an electric wire provided with a conductor and an insulator that coats an outer periphery of the conductor, a terminal connected to the conductor at a terminal end of the electric wire, and a molded resin portion that covers an outer periphery of the insulator at the terminal end of the electric wire and an outer periphery of an end portion on the electric wire side of the terminal is known as this type of wire harness.

SUMMARY

When a wire harness is to be attached to an automobile, if an electric wire is bent under severe conditions, such as an electric wire being bent with an extremely high curvature, a softer and thinner insulator tends to be adopted in order to increase the flexibility of the electric wire. On the other hand, if the insulator of the electric wire is made of a soft material, during formation of a molded resin portion through insert molding, the insulator, which is held in a mold, significantly deforms inward in the diameter direction. Thus, an inner edge portion at the end portion on the electric wire side of the molded resin portion tends to have a shape that cuts into the insulator. In particular, in a wire harness used to connect an inverter and a motor, a large electric current flows, and thus an electric wire with a wide diameter is often used. With this type of wire harness, a soft insulator needs to be designed, and thus a portion that cuts into the insulator tends to be formed in the molded resin portion. If the portion that cuts into the insulator is formed in the molded resin portion, when the wire harness is used, cracks appear in the insulator due to vibration, and there is a risk that the insulator will fracture in some cases. In particular, if vibration is applied in the state in which the electric wire is bent, the insulator tends to fracture.

The present disclosure is made in light of the above-described circumstances, and provides a wire harness in which cracks and fracturing are unlikely to appear in the insulator due to vibration, without impairing the flexibility of an electric wire.

An aspect of the present disclosure is a wire harness including: an electric wire provided with a conductor and an insulator that coats an outer periphery of the conductor; a terminal that is connected to the conductor at a terminal end of the electric wire; and a molded resin portion that covers an outer periphery of the insulator at the terminal end of the electric wire and an outer periphery of an end portion on the electric wire side of the terminal, in which a storage modulus $E'$ of the insulator that is measured using a dynamic viscoelasticity measurement device in a tensed mode at a temperature increase rate of 5° C./min and a frequency of 10 Hz is 100 MPa or less at 25° C. and 1 MPa or more at 250° C., and a starting temperature of a rubbery plateau region is 150° C. or less.

In the above-described wire harness, the insulator has a storage modulus $E'$ of 100 MPa or less at 25° C., and thus even though an electric wire is bent under severe conditions, the electric wire exhibits sufficient flexibility.

Also, in the above-described wire harness, the insulator has a storage modulus $E'$ of 1 MPa or more at 250° C., and thus deformation of the insulator inward in the diameter direction is suppressed in a high temperature environment during insert molding, and a portion that cuts into the insulator is unlikely to be formed in the molded resin portion. Therefore, with the above-described wire harness, it is possible to suppress the appearance of cracks in the insulator and fracturing of the insulator even though vibration is applied in the state in which the electric wire is bent.

Also, in the above-described wire harness, the starting temperature of the rubbery plateau region in the storage modulus $E'$ of the insulator is 150° C. or less. Thus, even in the case where the temperature received by the insulator from resin that flows during insert molding varies depending on the location of the molded resin portion, locations with a high storage modulus $E'$ or the like are unlikely to be formed in parts of the insulator. Therefore, with the above-described wire harness, a cutting-in portion that significantly cuts into the insulator is unlikely to form in the molded resin portion, and it is possible to suppress the appearance of cracks in the insulator and fracturing of the insulator even though vibration is applied in the state in which the electric wire is bent.

Thus, according to the present disclosure, it is possible to provide a wire harness in which cracks and fracturing are unlikely to appear in the insulator due to vibration, without impairing the flexibility of an electric wire.

BRIEF DESCRIPTION OF DRAWINGS

FIG. 5 is an illustrative diagram illustrating a method for evaluating flexibility in Experimental Example 1.

DESCRIPTION OF EMBODIMENTS

Figure 1:
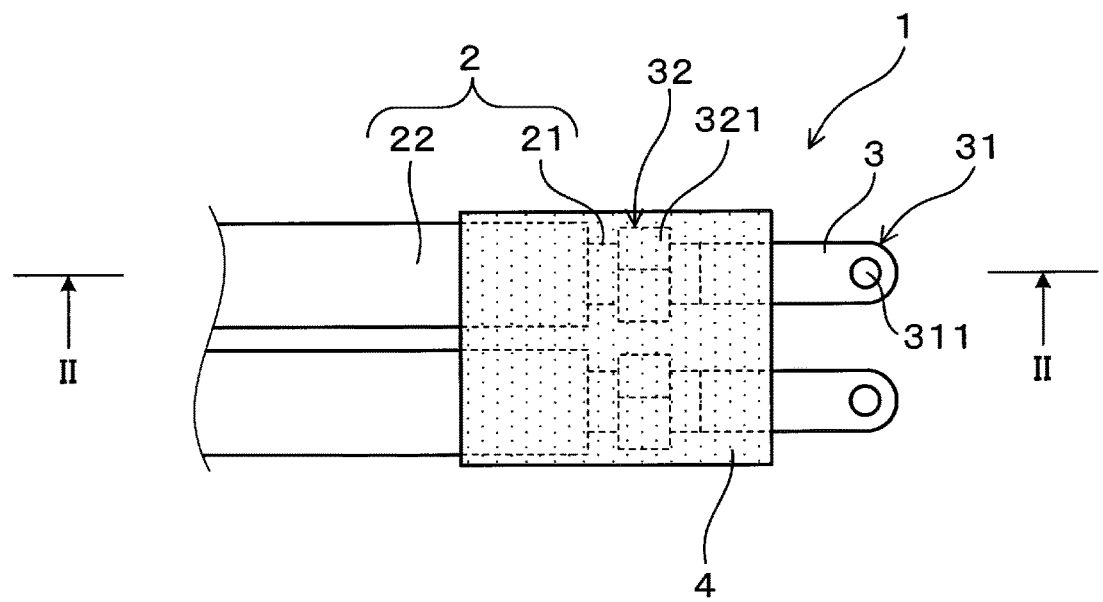
FIG. 1 is an illustrative diagram showing a portion of a wire harness according to Working Example 1.

The storage modulus $E'$ of an insulator in an electric wire has a temperature dependency, and the storage modulus tends to be relatively high on the low-temperature side and be relatively low on the high-temperature side where the X-axis is the temperature and the Y-axis is the storage modulus $E'$. If the insulator is designed to have a low storage modulus E' at 25° C. in order to increase the flexibility of the insulator, the insulator has a lower storage modulus E' in a high temperature environment during insert molding due to the above-described tendency. Thus, an inner edge portion at the end portion on the electric wire side of the molded resin portion tends to have a shape that cuts into the insulator. Conversely, if the insulator is designed to have a high storage modulus E' in a higher temperature environment in order to harden the insulator such that a cutting-in portion is not formed in a high temperature environment during insert molding, the insulator has a higher storage modulus E' at 25° C. and its flexibility is impaired due to the above-described tendency.

Thus, in the above-described wire harness, the storage modulus E' of the insulator is 100 MPa or less at 25° C. and 1 MPa or more at 250° C. Also, a starting temperature of a rubbery plateau region in the storage modulus E' of the insulator is 150° C. or less. Note that the storage modulus E' is measured using a dynamic viscoelasticity measurement device in a tensed mode under the conditions that the temperature increase rate is 5° C./min and that the frequency is 10 Hz.

The storage modulus E' at 25° C. is specified in the above description because a representative temperature of the environment in which the wire harness is attached is 25° C. and the storage modulus E' at this temperature is important for the flexibility of the electric wire. Also, the storage modulus E' at 250° C. is specified because the temperature of a resin material when a molded resin portion is formed through insert molding is 250° C. or more, and the storage modulus E' at this temperature is related to ease of formation of a portion in the molded resin portion that cuts into the insulator. Also, a region in which the storage modulus E' is flat or slopes gently in the relationship between the temperature and the storage modulus E' is referred to as a "rubbery plateau region". The starting temperature of the rubbery plateau region in the storage modulus E' is specified as 150° C. or less because of the following reasons. That is, the temperature received by the insulator from resin that flows during insert molding varies depending on the location of the molded resin portion. However, even though the location of the molded resin portion varies, the temperature of the resin that flows during insert molding hardly ever falls below 150° C. at location that is in contact with the insulator. Thus, if the starting temperature of the rubbery plateau region in the storage modulus E' is 150° C. or less, the hardness of the insulator becomes substantially constant due to the temperature received from the resin that flows during insert molding, and locations with a high storage modulus E' are unlikely to appear in parts of the insulator. Note that in this specification, the starting temperature of the rubbery plateau region is defined as a temperature at an intersection point of an extension line of the storage modulus E' in the rubbery plateau region and an extension line of the storage modulus E' in a region that is at a lower temperature than the rubbery plateau region and in which the storage modulus E' has a temperature dependence.

In the above-described wire harness, the insulator can be constituted by a crosslinked polyethylene or silicone. In this case, the insulator whose storage modulus E' satisfies the above-described conditions can be easily constructed. Thus, in this case, a wire harness in which the insulator is unlikely to fracture due to vibration can be reliably obtained without impairing the flexibility of the electric wire. One or more types of additives that are used in an electric wire may be blended in the insulator.

In the above-described wire harness, the molded resin portion can be constituted by polybutylene terephthalate or polyamide 6T. A resin temperature of polybutylene terephthalate during insert molding is about 250° C., and a resin temperature of polyamide 6T is about 320° C. Thus, in this case, the storage modulus E' of the insulator satisfies the above-described conditions, and thereby it is possible to reliably obtain a wire harness in which the insulator is unlikely to fracture due to vibration without impairing the flexibility of the electric wire.

The above-described wire harness can be used to connect an inverter and a motor in an automobile provided with the inverter and the motor, for example. In this case, an AC harness in which the insulator is unlikely to fracture due to vibration can be obtained without impairing the flexibility of the electric wire.

The above-described wire harness may have one electric wire and one terminal, or may have a plurality of electric wires and a plurality of terminals, for example. Also, in the latter case, a configuration is possible in which the molded resin portion collectively covers the outer peripheries of the insulators at the terminal ends of the electric wires and the outer peripheries of the end portions on the electric wire side of the terminals, for example. In this case, even though inner edge portions of the end portions on the electric wire side of the molded resin portions cut into the insulators, the starting temperature of the rubbery plateau regions in the storage moduli E' of the insulators is 150° C. or less, and thus locations with a high storage modulus E' are unlikely to form in parts of the insulators, and the cutting-in portions have small cutting-in amounts and the cutting-in amounts tend to be constant. Thus, in this case, even though vibration is applied in the state in which the electric wires are bent, fracturing of the insulators can be suppressed.

Note that the above-described configurations can be arbitrarily combined as needed in order to obtain the above-described functional effects or the like.

WORKING EXAMPLES

Hereinafter, wire harnesses of working examples will be described with reference to the drawings.

Working Example 1

Figure 2:
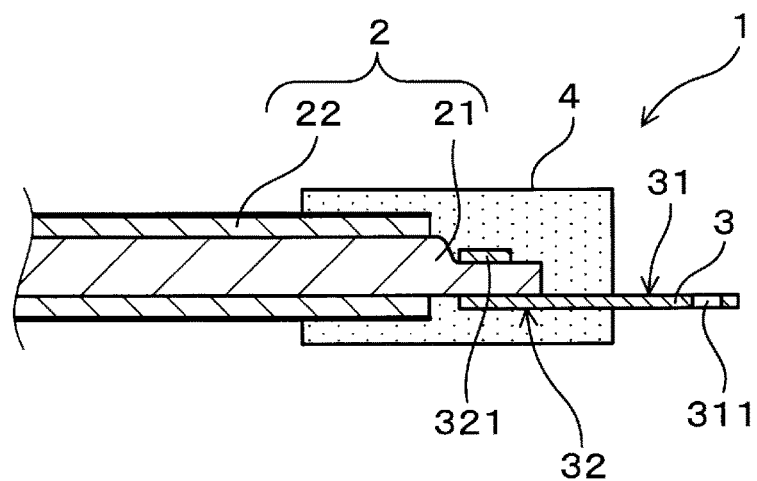
FIG. 2 is an illustrative diagram showing a cross section taken along line II-II in FIG. 1.
Figure 3:
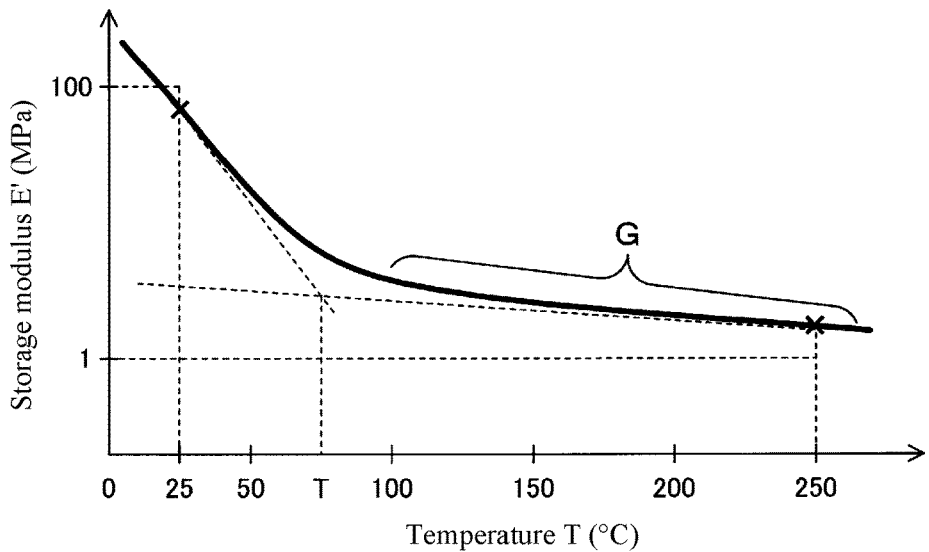
FIG. 3 is an illustrative diagram schematically showing a relationship between the temperature and the storage modulus $E'$ of an insulator.
Figure 4:
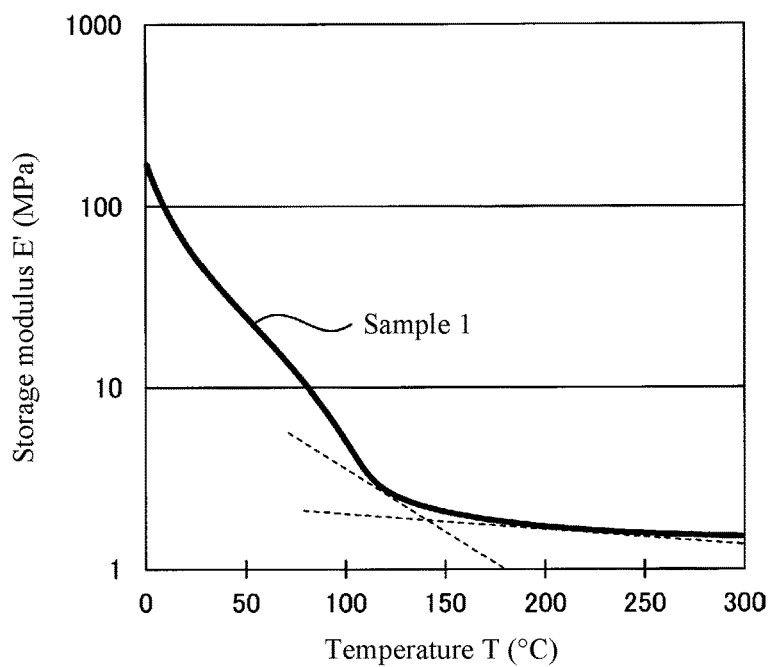
FIG. 4 is a diagram showing a relationship between the temperature of Sample 1 in Experimental Example 1 and the storage modulus $E'$ of the insulator.

A wire harness of Working Example 1 will be described with reference to FIGS. 1 to 3. As shown in FIGS. 1 to 3, a wire harness 1 of this example has electric wires 2, terminals 3, and a molded resin portion 4. In this example, the wire harness 1 is used to connect an inverter and a motor in an automobile (not shown) provided with the inverter and the motor. Also, in the drawings, an example is shown in which the wire harness 1 has a plurality of electric wires 2 and a plurality of terminals 3.

The electric wires 2 each include a conductor 21 and an insulator 22 that coats an outer periphery of the conductor 21. In this example, the conductor 21 is constituted by a twisted wire obtained by twisting a plurality of wires (not shown). The wire is made of a copper alloy plated with tin. The cross-sectional area of the conductor is 20 mm$^2$. The insulator 22 is constituted by a crosslinked polyethylene. The thickness of the insulator 22 is 1.1 mm. The insulator 22 is removed from the terminal end portion of the electric wire 2 and the conductor 21 is exposed.

The terminals 3 are connected to the conductors 21 at the terminal ends of the electric wires 2. In this example, the terminals 3 each have a connection portion 31 having an insertion hole 311 for passage of a fastening member (not shown) such as a bolt, and a crimping portion 32 having a pair of crimping pieces 321 that crimp the conductor 21. The terminals 3 are connected to the conductor 21 by crimping the crimping pieces 321 of the crimping portion 32.

The molded resin portion 4 is formed through insert molding, and covers the outer peripheries of the insulators 22 at the terminal ends of the electric wires 2 and the outer peripheries of the end portions on the electric wire 2 side of the terminals 3. In this example, the molded resin portion 4 collectively covers the outer peripheries of the insulators 22 at the terminal ends of the electric wires 2 and the outer peripheries of the end portions on the electric wire 2 side of the terminals 3. The molded resin portion 4 is constituted by polybutylene terephthalate or polyamide 6T. Note that if a water stopping structure is required, a seal material such as an adhesive may be provided in gaps between the insulators 22 of the electric wires 2 and the molded resin portion 4.

Here, as shown in FIG. 3, the storage modulus E' of the insulator 22 is 100 MPa or less at 25° C. and 1 MPa or more at 250° C. Also, a starting temperature T of rubbery plateau regions G at the storage moduli E' of the insulators 22 is 150° C. or less. Note that the storage modulus E' of the insulator 22 is measured using a dynamic viscoelasticity measurement device in a tensed mode at a temperature increase rate of 5° C./min and a frequency of 10 Hz.

Hereinafter, wire harness samples were produced and evaluated. Experimental examples thereof will be described.

EXPERIMENTAL EXAMPLES

Production of Samples

As shown in Table 1, electric wires that were coated with insulators whose moduli have different properties (different storage moduli E) and that had terminals crimped to their terminal ends were prepared. The cross-sectional area of the conductors of the electric wires was 20 mm². The insulators in Samples 1 to 4 and Samples 1C to 4C were all constituted by crosslinked polyethylene. The insulator in Sample 5 was constituted by silicone. Note that the property of the storage modulus E' was changed by adjusting the type, the blending ratio, the degree of crosslinking, or the like of resins in the insulator formation materials. Also, a dynamic viscoelasticity measurement device "DMA2980" manufactured by TA Instruments was used to measure the storage modulus E. The measurement mode was a tensed mode, the temperature increase rate was 5° C./min, and the frequency was 10 Hz. Also, the measurement atmosphere was air, and the measurement temperature range for the samples whose insulators were constituted by crosslinked polyethylene was set to 0° C. to 300° C. The measurement temperature range for the sample whose insulator was constituted by silicone was set to −80° C. to 300° C. Also, the measurement samples were obtained by cutting out insulators having a length of 12 mm, a width of 5 mm, and a thickness of 0.5 mm from the electric wires in which the cross-sectional area of the conductors was 20 mm².

Two types, namely, polybutylene terephthalate (PBT) (manufactured by POLYPLASTICS CO., LTD., "DURANEX 330HR") and polyamide 6T (PA6T) (manufactured by DuPont, "HTNFR52G30NHF"), were prepared as the molding resin for insert molding.

Terminal end portions of two electric wires on one side were arranged side by side in a molding space of a mold constituted by an upper mold and a lower mold, and one of the above-described molding resins shown in Table 1 was injected into the molding space using an injection apparatus. Also, the molding resin was similarly injected into the molding space for the terminal end portions of the two electric wires on the other side. Accordingly, molded resin portions having a shape as shown in FIG. 1 were formed at both end terminals of the electric wires. The molded resin portions of the samples each collectively coated the terminal end portions of the two electric wires. Note that the length of the electric wire between molded resin portions was set to 100 mm. Also, when polybutylene terephthalate was used, the resin temperature during insert molding was 250° C. and the mold temperature was 80° C. On the other hand, when polyamide 6T was used, the resin temperature during insert molding was 320° C. and the mold temperature was 150° C.

Flexibility

As shown in FIG. 5, one end portion of the wire harness 1 of the sample was fixed to a fixing table 91 having a height of 30 mm, and a load (N) was measured when a molded resin portion 4 on the other end portion that was not fixed was pressed by a force gauge 92 and the electric wire portion was bent 90 degrees. Then, a value was calculated by dividing the obtained load by the number of electric wires provided in the wire harness 1 of the sample. The case where the load per electric wire was 5N or less was evaluated as "A" because the sample had flexibility, and the case where the load per electric wire was 6N or more was evaluated as "C" because the sample had poor flexibility. Note that if the load per electric wire was 5N or less in this flexibility evaluation, the molded resin portion may collectively cover two or more electric wires.

State of Insulator after Vibration Application Testing

Figure 6A:
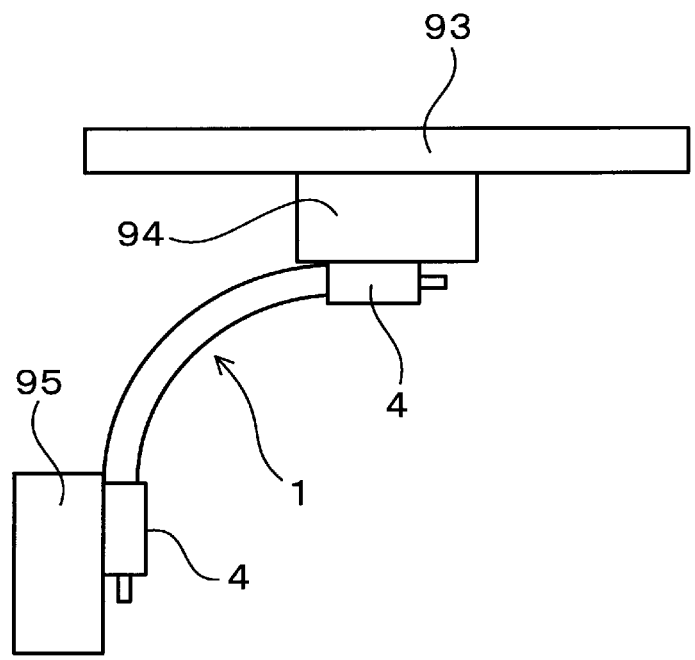
FIG. 6 is an illustrative diagram illustrating a vibration application testing method in Experimental Example 1, (a) being a diagram of a wire harness fixed to a composite environment testing apparatus viewed from above, and (b) being a diagram of the wire harness fixed to the composite environment testing apparatus viewed from the side.
Figure 6B:
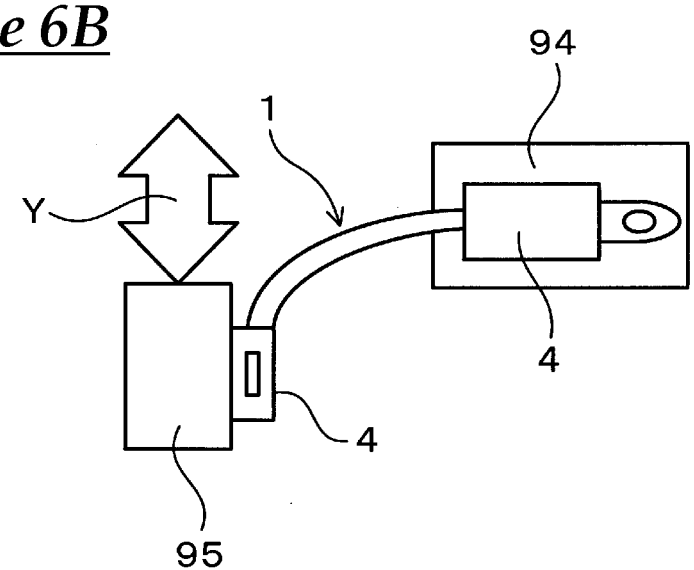

As shown in FIG. 6, one of the molded resin portions 4 in wire harness 1 of the sample was fixed to a fixing jig 94 provided on a wall portion 93 of a composite environment testing apparatus (manufactured by EMIC CORPORATION, "EVTC-1"), and the other molded resin portion 4 was fixed to a movable jig 95 of the composite environment testing apparatus. The movable jig 95 was vibrated as shown by arrow Y in the vertical direction in the state in which the wire harness 1 was bent in this manner. The vibration conditions were such that the frequency was 10 Hz and the number of instances of vibration was 15 million. Thereafter, the molded resin portion was dismantled, and the state of the insulator that was covered by the molded resin portion was checked. The case where the above-described vibration application did not cause cracks or fracturing in any of the insulators at four locations that were coated with the molded resin portions was evaluated as "A". Similarly, the case where some of the insulators at the four locations fractured, or the case where cracks appeared in any of the insulators at four locations was evaluated as "B". The case where all of the insulators at four locations fractured was evaluated as "C".

The dynamic viscoelastic property of the insulators in the wire harnesses of the samples, the type of molding resin used in the molded resin portion, and various evaluation results are collectively shown in Table 1.

TABLE 1

|  | Sample 1 | Sample 2 | Sample 3 | Sample 4 | Sample 5 | Sample 1C | Sample 2C | Sample 3C | Sample 4C |
| --- | --- | --- | --- | --- | --- | --- | --- | --- | --- |
| Insulator | | | | | | | | | |
| storage modulus E' at 25° C. (MPa) | 70 | 85 | 100 | 15 | 4 | 105 | 75 | 65 | 10 |
| storage modulus E' at 250° C. (MPa) | 2 | 5 | 1 | 3 | 4 | 2 | 0.9 | 4 | 0.6 |
| rubbery plateau region start temperature | 148 | 140 | 128 | 105 | −60 | 130 | 138 | 154 | 159 |
| Molded resin portion | PBT | PBT | PA6T | PBT | PA6T | PBT | PBT | PA6T | PA6T |
| Evaluation | | | | | | | | | |
| flexibility | A | A | A | A | A | C | A | A | A |
| state of insulator after vibration application evaluation | A | A | A | A | A | A | B | B | C |

According to Table 1, the following can be found. With Sample 1C, the storage modulus E' of the insulator exceeded 100 MPa at 25° C. Thus, the flexibility of the electric wire in Sample 1C was poor, and it was difficult to handle severe electric wire bending conditions such as 90-degree bending.

With Sample 2C, the storage modulus E' of the insulator was less than 1 MPa at 250° C. Thus, with Sample 2C, cracks appeared in the insulator due to vibration. This is because the insulator held in the mold significantly deformed inward in the diameter direction when the molded resin portions were formed through insert molding, and a cutting-in portion that cut into the insulator was formed in the inner edge portion of the end portion on the electric wire side of the molded resin portion, and the insulator was impaired by this cutting-in portion.

With Sample 3C, the starting temperature of the rubbery plateau region in the storage modulus E' of the insulator exceeded 150° C. Thus, with Sample 3C, when vibration was applied in the state in which the electric wire was bent, cracks appeared in the insulator. This is because the insulator had locations with a high storage modulus E' due to variation in the temperature received by the insulator from the resin that flowed during insert molding.

With Sample 4C, the storage modulus E' of the insulator was less than 1 MPa at 250° C., and the starting temperature of the rubbery plateau region exceeded 150° C. Thus, with Sample 4C, when vibration was applied in the state in which the electric wire was bent, the insulator fractured.

In contrast, with Samples 1 to 5, the storage moduli E' of the insulators were 100 MPa or less at 25° C. and 1 MPa or more at 250° C., and the starting temperature of the rubbery plateau region in the storage modulus E' was 150° C. or less. Therefore, according to Samples 1 to 5, it was confirmed that wire harnesses in which cracks were unlikely to appear in the insulators due to vibration and the insulators were unlikely to fracture were obtained without impairing the flexibility of the electric wires.

Although the working examples of the present disclosure have been described in detail above, the present invention is not merely limited to the above-described working examples, and various modifications can be made without departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above.

Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A wire harness comprising:
   an electric wire provided with a conductor and an insulator that coats an outer periphery of the conductor;
   a terminal that is connected to the conductor at a terminal end of the electric wire; and
   a molded resin portion that covers an outer periphery of the insulator at the terminal end of the electric wire and an outer periphery of an end portion on the electric wire side of the terminal,
   wherein a storage modulus E' of the insulator that is measured using a dynamic viscoelasticity measurement device in a tensed mode at a temperature increase rate of 5° C./min and a frequency of 10 Hz is 100 MPa or less at 25° C. and 1 MPa or more at 250° C., and a starting temperature of a rubbery plateau region is 150° C. or less.

2. The wire harness according to claim 1,
   wherein the insulator is constituted by a crosslinked polyethylene or silicone.

3. The wire harness according to claim 1,
   wherein the molded resin portion is constituted by polybutylene terephthalate or polyamide 6T.

4. The wire harness according to claim 1,
   wherein the wire harness is used to connect an inverter and a motor in an automobile provided with the inverter and the motor.

5. The wire harness according to claim 1, comprising:
   a plurality of the electric wires; and
   a plurality of the terminals,
   wherein the molded resin portion collectively covers the outer peripheries of the insulators at the terminal ends of the electric wires and the outer peripheries of the end portions on the electric wire side of the terminals.

* * * * *